US010686695B1

(12) United States Patent
Nainar et al.

(10) Patent No.: US 10,686,695 B1
(45) Date of Patent: Jun. 16, 2020

(54) PROACTIVE PREFIX DISAGGREGATION FOR TRAFFIC ASSURANCE IN DATA CENTER ROUTING

(71) Applicant: Cisco Technology, Inc., San Jose, CA (US)

(72) Inventors: Nagendra Kumar Nainar, Morrisville, NC (US); Pascal Thubert, Roquefort les Pins (FR); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/296,896

(22) Filed: Mar. 8, 2019

(51) Int. Cl.
*H04L 12/703* (2013.01)
*H04L 12/24* (2006.01)
*H04L 12/741* (2013.01)
*H04L 12/753* (2013.01)
*H04L 12/745* (2013.01)

(52) U.S. Cl.
CPC .......... *H04L 45/28* (2013.01); *H04L 41/0677* (2013.01); *H04L 45/48* (2013.01); *H04L 45/54* (2013.01); *H04L 45/748* (2013.01)

(58) Field of Classification Search
CPC ....... H04L 45/28; H04L 45/748; H04L 45/48; H04L 45/54; H04L 41/0677
See application file for complete search history.

(56) References Cited

U.S. PATENT DOCUMENTS

| 2003/0185148 A1* | 10/2003 | Shinomiya | H04J 14/0227 370/216 |
| 2010/0020806 A1* | 1/2010 | Vahdat | H04L 45/00 370/395.31 |
| 2013/0308444 A1* | 11/2013 | Sem-Jacobsen | H04L 47/125 370/230 |

OTHER PUBLICATIONS

Przygienda, "RIFT: A Novel DC Fabric Routing Protocol," Draft-Przygienda-Rift, IETF '98, Juniper Networks, pp. 1-20.
Przygienda et al., "RIFT: Routing in Fat Trees," draft-przygienda-rift-01, Juniper Networks, Jan. 24, 2017, pp. 1-40.
de Oliveira Alves, "IP Prefixes Aggregation," Dissertation, Nov. 2012, pp. 1-68.

* cited by examiner

*Primary Examiner* — Rina C Pancholi
(74) *Attorney, Agent, or Firm* — Polsinelli PC

(57) ABSTRACT

The present disclosure provides a proactive method of prefix disaggregation in a network fabric when one or more communication failures are detected. In one aspect, a method includes determining, by a first node of a network fabric, a corresponding prefix disaggregation policy for at least one second node of the network fabric, the corresponding prefix disaggregation policy identifying one or more network prefixes that are inaccessible via the first node when at least one communication failure is detected in association with the first node; sending the corresponding prefix disaggregation policy to the second node; and causing the second node to implement the prefix disaggregation policy upon detecting the at least one communication failure.

18 Claims, 6 Drawing Sheets

PROACTIVE PREFIX DISAGGREGATION FOR TRAFFIC ASSURANCE IN DATA CENTER ROUTING

TECHNICAL FIELD

The subject matter of this disclosure relates in general to the field of computer networking, and more particularly, to systems and methods for ensuring accurate traffic routing in a data center in light of possible communication failures.

BACKGROUND

Data center networks have become massively large in order to meet data processing demands. This enlargement raises various scaling challenges in terms of forwarding table size for each node in a network, control plane information flooding, network convergence, etc. Various proposals are underway for addressing the above challenges. For example, Intermediate System (ISIS) Spine Leafe (ISIS-SL) (Spine-Leaf), Routing in Fat Trees (RIFT), etc. are few of the proposals to address the challenges in data center routing.

One specific challenge in data center routing is the problem of link failures between two nodes within a network fabric and/or failure of intermediate/spine nodes (e.g., nodes of the fabric other than leaf nodes). Such failures can result in black holes. Black holes occur when traffic destined to or originating from a particular network prefix, via the failed link and/or a failed intermediate node, arrives and remain at the failed intermediate node without being delivered to its intended destination due to the failure. Prefix disaggregation is a mechanism by which, after a failure is detected, either an intermediate node creates and advertises a traffic routing policy to downstream nodes not to use the intermediate node for one or more affected network prefixes or other functioning intermediate nodes create and advertise traffic routing policies to downstream nodes to use one or more of the functioning intermediate nodes to reach the affected network prefixes.

These prefix disaggregation mechanisms and policies are created an implemented in a reactive manner (in response to a detected link/node failure) and thus are inefficient and introduce unnecessary delays in fixing or adjusting traffic routing to avoid failures.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
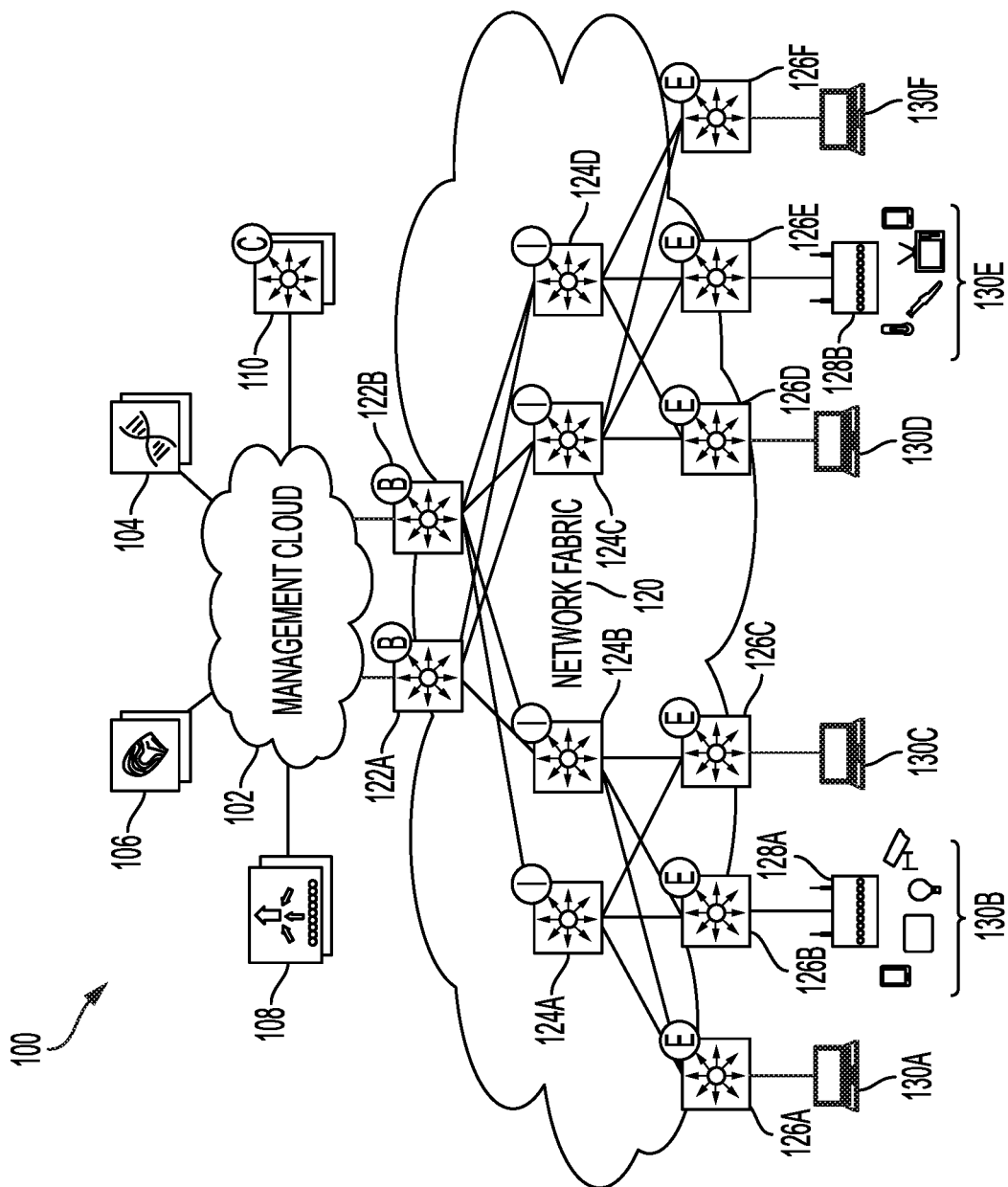
FIG. 1 illustrates an example setting of a physical topology of an enterprise network, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

The present disclosure provides a unique method of proactively determining disaggregation policies for possible link/node failures in a network fabric and advertising the same to relevant downstream (leaf) nodes for implementation when a corresponding link/node failure is detected.

In one aspect, a method includes determining, by a first node of a network fabric, a corresponding prefix disaggregation policy for at least one second node of the network fabric, the corresponding prefix disaggregation policy identifying one or more network prefixes that are inaccessible via the first node when at least one communication failure is detected in association with the first node; sending the corresponding prefix disaggregation policy to the second node; and causing the second node to implement the prefix disaggregation policy upon detecting the at least one communication failure.

In one aspect, a network node includes one or more memories having computer-readable instructions stored therein and one or more processors. The one or more processors are configured to execute the computer-readable instructions to determine a corresponding prefix disaggregation policy for at least one first node of the network fabric, the corresponding prefix disaggregation policy identifying one or more network prefixes that are inaccessible via the network node when at least one communication failure is detected in association with the network node; send the corresponding prefix disaggregation policy to the first node; and cause the first node to implement the prefix disaggregation policy upon detecting the at least one communication failure.

In one aspect, one or more non-transitory computer-readable media includes computer-readable instructions, which when executed by one or more processors, cause the one or more processors to determine a corresponding prefix disaggregation policy for at least one first node of the network fabric, the corresponding prefix disaggregation policy identifying one or more network prefixes that are inaccessible via the network node when at least one communication failure is detected in association with the network node; send the corresponding prefix disaggregation policy to the first node; and cause the first node to implement the prefix disaggregation policy upon detecting the at least one communication failure.

DETAILED DESCRIPTION

FIG. 1 illustrates an example setting of a physical topology of an enterprise network, according to one aspect of the present disclosure.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some example embodiments, one or more Digital Network Architecture (e.g., Cisco DNA™) appliances can operate as the network controller appliance(s) 104 and may be referred to as a DNA controller 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 106 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122. Network fabric 120 may represent an example of a data center.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some example embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

FIG. 1 illustrates a simple network fabric 120 (an example data center) having a spine-leaf structure in which nodes 126A to 126F may be referred to as leaf nodes or repair nodes, nodes 124A t0 124D may be referred to as intermediate/spine nodes or top of pod (ToP) nodes and nodes 122A and 122B may be referred to as top of fabric (ToF) or super spine nodes. One or more network prefixes can be associated with each of leaf nodes 126A to 126F such as network prefixes of devices 130A to 130F. As noted above, nodes 126A to 126F, 124A to 124D and 122A and 122B can be switches.

Figure 2:
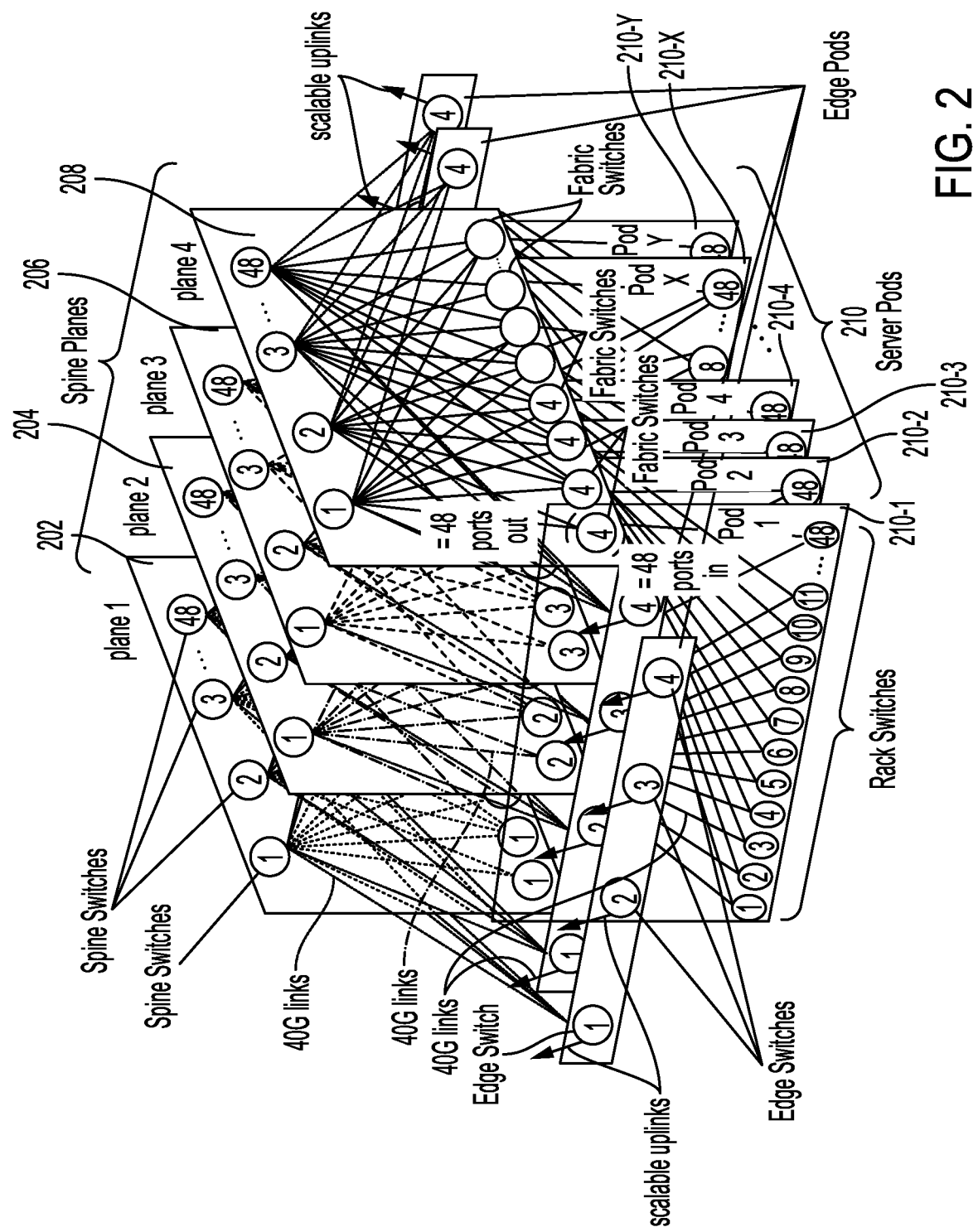
FIG. 2 illustrates an example of a scaled network fabric using partitioned super spines, according to one aspect of the present disclosure.

As noted above, scaling of data centers and network fabrics used therein can be inhibited by limitations in switch sizes, etc. Accordingly, the scaling may be achieved by interconnecting hundreds or thousands of smaller switches. Hereinafter, terms switch and node may be used interchangeably. FIG. 2 illustrates an example of a scaled network fabric using partitioned super spines, according to one aspect of the present disclosure.

In example network fabric 200 of FIG. 2, due to a size of the fabric and limitations on number of ports, spine nodes can be partitioned into different spine places such as spine planes 202, 204, 206 and 208. In this non-limiting example, each of spine planes 202, 204, 206 and 208 may have a number of super spines (e.g., 48 super spines in this case). For example, spine plane 202 has 48 super spines, spine plane 204 has 48 super spines, spine plane 206 has 48 super spines and spine plane 208 has 48 super spines. A number of super spines in each plane is not limited to 48 and can be more or less.

FIG. 2 also illustrates a number of Pods 210. A pod may be defined as at least a 2 layer vertical structure in which a number of top of the rack switches (leaf nodes) are connected to one or more edge switches such as edge switches 212, 214, 216 and 218 of pod 210-1 (which can be the same as intermediate spine nodes described above). As shown in FIG. 2, server pods 210-1, 210-2, 210-3 . . . 210-X and 210-Y each have a number of leaf nodes (e.g., 48 in example of FIG. 2) and four edge switches. Each edge switch of each server pod may be connected to at least two super spines in two different ones of spine planes 202, 204, 206 and 208. As can be seen from FIG. 2, each server pod of server pods 210-1, 210-2, 210-3, 210-4 . . . 210-X and 210-Y have at least one edge node in each of spine planes 202, 204, 206 and 208. In example of FIG. 2, server pods 210-1, 210-2, 210-X and 210-Y may be referred to as edge pods 210-1, 210-2, 210-X and 210-Y, respectively.

Figure 3:
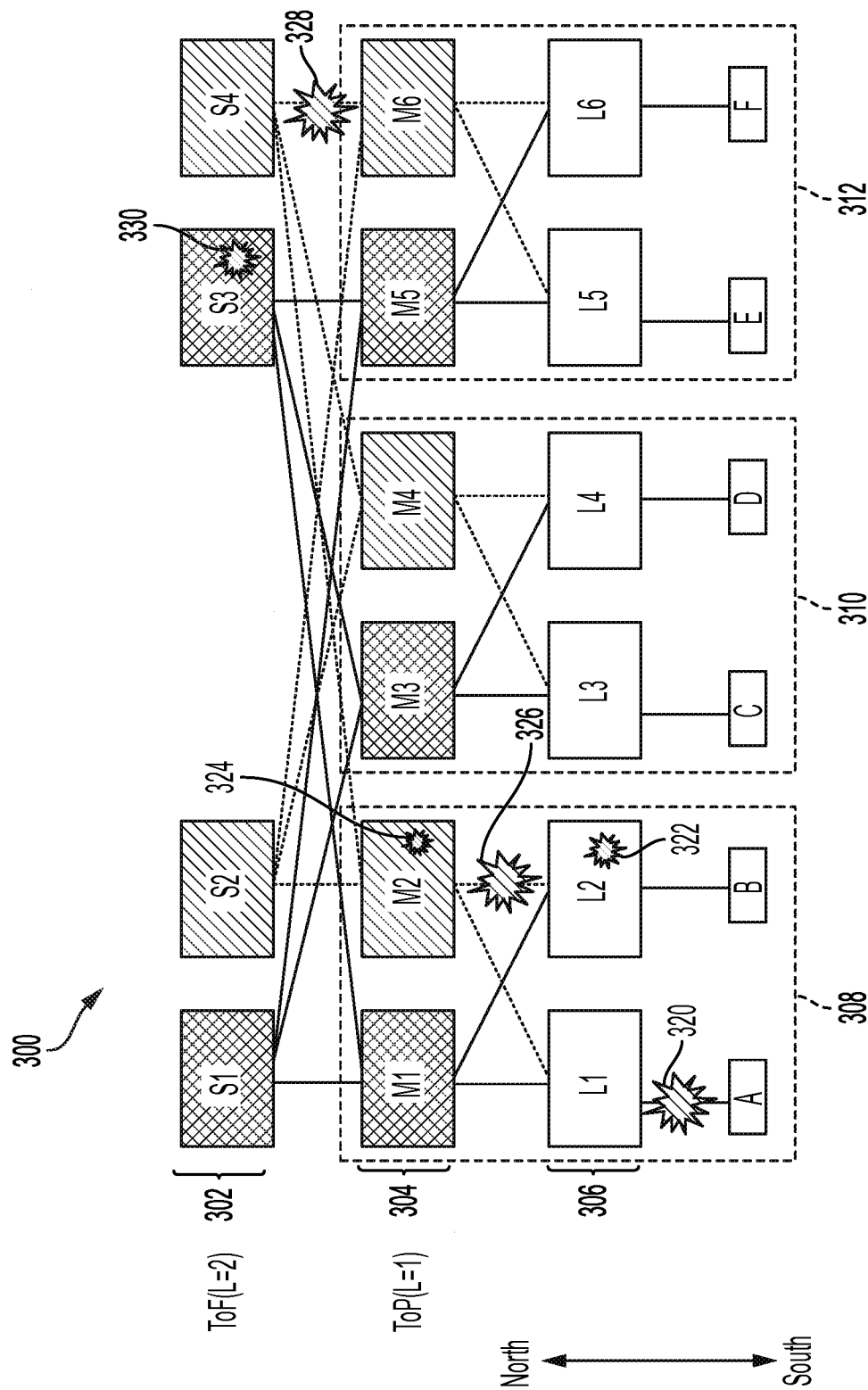
FIG. 3 illustrates a simplified structure of a network fabric with leaf nodes connected to spines in two different planes, according to one aspect of the present disclosure.

FIG. 3 illustrates a simplified structure of a network fabric with leaf nodes connected to spines in two different planes, according to one aspect of the present disclosure. In example of FIG. 3, network fabric 300 has 3 layers of nodes. Layer ToF 302 that includes spine nodes S1, S2, S3 and S4, where spine nodes S1 and S3 are in one spine plane such as spine plane 202 of FIG. 2 and spine nodes S2 and S4 are in a different spine plane such as spine plane 204 of FIG. 2.

Another layer of network fabric 300 is layer ToP 304 that includes 6 exemplary intermediate nodes (edge switches) M1, M2, M3, M4, M5 and M6. In this particular example, intermediate nodes M1, M3 and M5 are connected to spine nodes S1 and S3 while intermediate nodes M2, M4 and M6 are connected to spine nodes S2 and S4.

The most southern layer of example network fabric 300 is leaf layer 306 that includes leaf nodes L1, L2, L3, L4, L5 and L6. In this particular example, L1 and L2 are connected (linked) to M1 and M2, L3 and L4 are connected (linked) to M3 and M4 and L5 and L6 are connected (linked) to M5 and M6. Accordingly, any prefix accessible via any one of leaf nodes L1 to L6 can be reached from any other prefix accessible via any one of leaf nodes L1 to L6.

FIG. 3 also illustrates example server Pods that have also been described above with reference to FIG. 2. Server pod 308 is formed of L1, L2, M1 and M2, server pod 310 is formed of L3, L4, M3 and M4 and server pod 312 is formed of L5, L6, M5 and M6.

Furthermore, each of leaf nodes L1, L2, L3, L4, L5 and L6 are shown to have at least one network prefix of a device accessible therethrough. For example, network prefix A is accessible via (associated with) L1, network prefix B is accessible via (associated with) L2, network prefix C is accessible via (associated with) L3, network prefix D is accessible via (associated with) L4, network prefix E is accessible via (associated with) L5 and network prefix F is accessible via (associated with) L6. While only a single prefix is shown in association with each leaf node, the present disclosure is not limited thereto and there can be multiple (e.g., tens of, hundreds of, thousands of) prefixes accessible via a given leaf node.

Furthermore, while in example of network fabric 300 each of pods 308, 310 and 312 are shown to include only two leaf nodes, the number of leaf nodes of a given pod is not limited thereto. In other words, the number of lead nodes and intermediate nodes of a server pod need not be the same and there can more leaf nodes than intermediate nodes in a server pod.

Lastly, example network fabrics described herein have a spine/leaf structure. However, concepts described in the present disclosure are equally applicable to network fabrics having a fat tree structure.

Hereinafter, example structure of FIG. 3 with a 3 layer network fabric will be referenced for describing example embodiments of proactive disaggregation of prefixes due to node and link failures. However, the present disclosure is not limited thereto and can be applied to any type of known or to be developed network fabric having more or less than 3 layers of nodes. Furthermore, the present disclosure is not limited to network fabrics in which spine nodes are in different spine planes. For example, network fabric 300 can have all spine nodes S1, S2, S3 and S4 in a single spine plane.

FIG. 3 also includes a North-South indication for describing relative positions of nodes and switches in example embodiments below.

There are a number of possible failures (potential failures) that may occur within example network fabric 300. Such failures can be node failures or link failures. Examples of node failures include failures of any leaf node, any intermediate node or a spine node. Example of link failures include failures of links between leaf nodes and corresponding network prefixes and associated devices accessible therethrough, failures of links between leaf nodes and intermediate nodes, and failures of links between intermediate nodes and spine nodes.

When there is no link or node failure within network fabric 300, all leaf nodes and/or intermediate nodes (L1 to L6 and M1 to M6) implement equal-cost multipath (ECMP) to load balance between their respective northern neighbors (nodes). However, one or more link or node failures within network fabric 300 may force adjustment in routing table of affected nodes within network fabric 300. This adjustment may be referred to as prefix disaggregation, whereby a northern node (e.g., a spine or and intermediate node of FIG. 3) informs relevant southern neighbors/nodes to avoid using the northern node to reach network prefixes available via that northern node, when a link/node failure prevent communication to and from the network prefixes via the northern node. Without prefix disaggregation, all packets that arrive at the northern node and are destined for affected network prefixes will be black holed in the northern node and will not be routed correctly. This will be further described below. Prefix disaggregation can be positive or negative. A negative prefix disaggregation is one where an affected node advertises its unavailability to relevant southern nodes to reaching certain prefixes. A positive prefix disaggregation is one where not-affected nodes advertise their availability to relevant southern nodes to only use the non-affected nodes for reaching certain prefixes (no longer available through the affected node)

Shown in FIG. 3 are various possible failures. Failure 320 is a possible southern link failure (last southern link failure) between leaf node L1 and prefix A, which causes loss of connectivity to prefix A and/or any other prefix or network node accessible via (connected to or attached to) L1, for all spine nodes S1, S2, S3 and S4. Prefix disaggregation is not needed for failures such as failure 320 since connectivity to prefix A is lost for all (through all spine nodes S1, S2, S3 and S3).

Failure 322 is a possible node failure of a leaf node such as L2 (leaf node failure). Similar to failure 320, failure 322 causes loss of connectivity to prefix B and/or any other prefix or network node accessible via (connected to or attached to) L2, for all spine nodes S1, S2, S3 and S4. Prefix disaggregation is not needed for failures such as failure 322 since connectivity to prefix B is lost for all (through all spine nodes S1, S2, S3 and S3).

Failure 324 is a possible node failure for an intermediate node such as node M2 (ToP node failure or intermediate node failure). Failure 324 causes loss of connectivity to prefix A and prefix B and/or any other prefix or network node accessible via (connected to or attached to) L1 and L2, through M2. In other words, loss of connectivity to prefix A and prefix B occur in spine plane formed of S2, S4, M2, M4 and M6. Prefix disaggregation is necessary here, whereby leaf nodes L1, L2, L3, L4, L5, L6 should be instructed to update their corresponding forwarding table to avoid M2 due to failure 324 (e.g., instead use spine plane formed of S1, S3, M1, M3 and M5 for communications) to and from prefixes A and B.

Failure 326 is a possible link failure between leaf node L2 and intermediate node M2 (last northern link failure from a leaf node). Failure 326 causes loss of connectivity to prefix B and/or any other prefix or network node accessible via (connected to or attached to) L2, through M2. In other words, due to failure 326, prefix B cannot be reached via M2 and consequently through nodes of spine plane formed of S2, S4, M2, M4 and M6. However, in comparison with failure 324, prefix A accessible via L1 can still be reached via M2 since the failure is a link failure between M2 and L2 and not a failure of M2 itself. Prefix disaggregation is necessary here, whereby leaf nodes L1, L2, L3, L4, L5, L6 should be instructed to update their corresponding forwarding table to avoid M2 due to failure 324 (e.g., instead use spine plane formed of S1, S3, M1, M3 and M5) for communications to and from prefix B.

Failure 328 is a possible link failure between intermediate node M6 and spine node S4 (last northern link failure from a ToP node or an intermediate node). Failure 328 causes loss of connectivity to prefixes E and F and/or any other prefix or network node accessible via (connected to or attached to) L5 and L6, through M6. In other words, loss of connectivity to prefix E and prefix F occurs partially in spine plane formed of S2, S4, M2, M4 and M6. Due to failure 328, prefixes E and F cannot be reached via S4. Prefix disaggregation is necessary here, whereby leaf nodes L1, L2, L3, L4, L5, L6 should be instructed to update their corresponding forwarding table to avoid S4 due to failure 328 (e.g., instead use S2 to reach M6 or use spine plane formed of S1, S3, M1, M3 and M5) for communications to and from prefixes E and/or F.

Failure 330 is a possible node failure for spine node S3 (ToF node failure or spine node failure). Failure 330 causes loss of connectivity to prefix E and prefix F and/or any other prefix or network node accessible via (connected to or attached to) S3. In other words, loss of connectivity to prefix E and prefix F occurs partially in spine plane formed of S1, S3, M1, M3 and M5. Prefix disaggregation is necessary here, whereby leaf nodes L1, L2, L3, L4, L5, L6 should be instructed to update their corresponding forwarding table to avoid S3 due to failure 330 (e.g., instead use S1 to reach M5 and/or M6 or use spine plane formed of S2, S4, M2, M4 and M6) for communications to and from prefixes E and/or F.

In FIG. 3 and for purposes of the present disclosure, a link between any two node of fabric 300 may be identified by its corresponding end points. For example, a link connecting M1 to L1 may be identified as link M1-L1, a link connecting S1 to M1 may be identified as link S1-M1, etc. A link may be any know or to be developed medium of communication between two corresponding nodes connected by such link.

Failures 320, 322, 324, 326, 328 and 330 present a few examples of possible failure within a network fabric, whereby one or more possible communication routes to and from one or more network prefixes become unavailable. Addressing these failures can be optimized and made more efficient if such failures and the ensuing adjustments in routing (via pre-fix disaggregation) can be pre-computed and forward to relevant leaf nodes/intermediate nodes so that once an actual failure occurs, traffic routing updates can be quickly implemented. This may be referred to as a proactive prefix disaggregation process.

Figure 4:
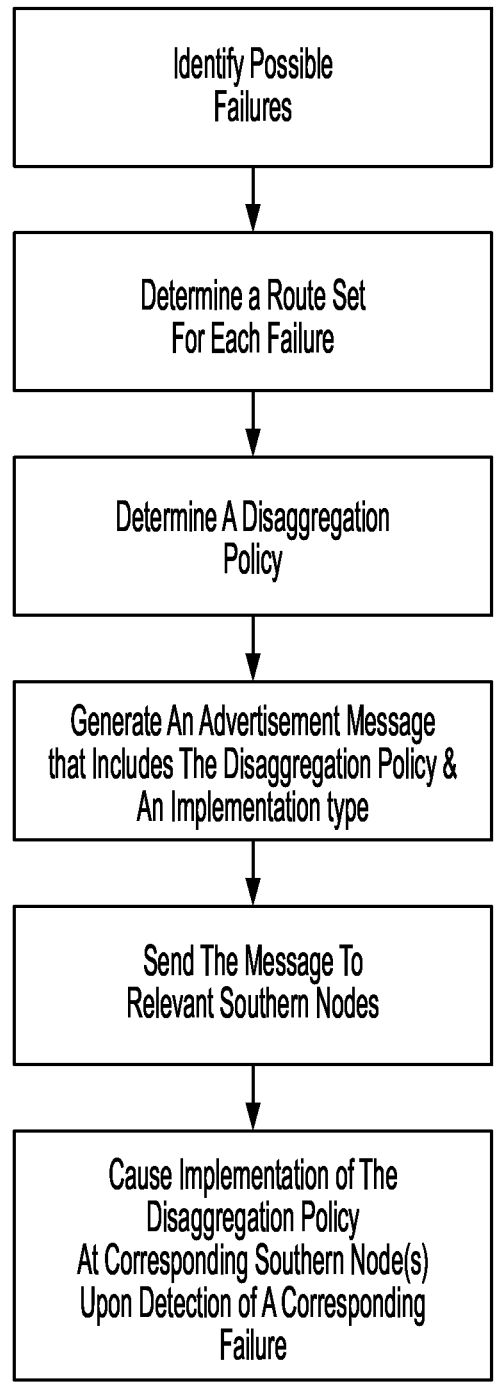
FIG. 4 is an example method of proactive prefix disaggregation, according to one aspect of the present disclosure.

FIG. 4 is an example method of proactive prefix disaggregation, according to one aspect of the present disclosure. Example of proactive prefix disaggregation may be performed in a distributed fashion by each node of fabric 300 having at least one southern neighbor/node connected thereto in a fabric having a spine/leaf structure (e.g., any one of nodes M1, M2, M3, M4, M5, M6, S1, S2, S3 and/or S4 of FIG. 3) or by a most northern node in a fabric having a fat tree structure. Regardless of which node FIG. 4 is implemented at, such node may be referred to as first node. FIG. 4 will be described with reference to FIG. 2 and/or FIG. 3.

At S400, first node may identify possible failures (possible communication failures) in association with the first node. Possible failures include any failure (node failure or link failure) affecting communication between the first node any two or more downstream/southern nodes (second nodes). For example and with reference to server pod 308 of FIG. 3, at S400, M1 identifies possible failures as failure of node M1, failure of link connecting M1 to L1 (M1-L1) link and failure of link connecting M1 and L2 (M1-L2 link). In one example, first node determines all failures for which prefix disaggregation would be implemented. For example, M1 does not consider failure 320 or failure 322 as a possible failure as failure 320 and 322 do not require prefix disaggregation, as described above.

In another example, first node may be S1 and therefore possible failures may include failure of node S1, failure of any one of nodes M1, M3 and M5 and any one of corresponding links S1-M1, S1-M3 and S1-M5 links, failure of node M1, failure of links M1-L1 and M1-L2, failure of node M3, failure of links M3-L3 and M3-L4, failure of node M5, and failure of links M5-L5 and M5-L6.

While node and link failures have been described as particular examples of a failure, possible failures are not limited thereto and may include any other known or to be developed failure that can occur within network fabric 300 and adversely affect routing to and from certain prefixes.

At S402, first node determines a route set (a disaggregation route set) for each possible failure identified at S400. A route set may identify a set of prefixes may be affected/unavailable when the corresponding failure occurs. For example, in the example of M1 being the first node and M1-L1 being an identified possible failure, M1 determines the set route as follows:

protected_node(M1) {
    dis-aggregate_routeset1={prefix (A), cause[link_failure(M1-L1)]}
    dis-aggregate_routeset2={prefix (B), cause[link_failure(M1-L2)]}
} where protected node is the node at which S400 and S402 is being implemented. The above route set indicates that when the possible failure is failure of link M1-L1, prefix A becomes unavailable (cannot be reached) via M1 (protected node) and when the possible failure is failure of link M1-L2, prefix B becomes unavailable (cannot be reached) via M1 (protected node).

In one example, because the prefixes to be disaggregated are identified and computed before an actual relevant communication failure occurs, such disaggregation route sets may be referred to as pre-computed (proactive) disaggregation route sets and thus the entire process of FIG. 4 may be referred to as pre-computed (proactive) prefix disaggregation process.

After performing S400 and S402, first node has a set of possible failures (at least one possible failure) identified at S400 and a set of disaggregation route sets (at least one disaggregation route set). At S404, first node determines a prefix disaggregation policy based on the identified possible failures and corresponding disaggregation route sets.

In one example, such policy is a set of conditional instructions that defines a plurality of conditions, each condition corresponding to one possible failure and triggering disaggregation of one or more network prefixes identified by a corresponding route set when the one possible failure is detected. An example of such disaggregation policy is:

if cause {
set (route), D
} where cause is one of the possible failures of S400, route is a corresponding disaggregation route set for the cause, and D is the protected node (e.g., M1 or M2).

In one example, there may be more than one possible failure and thus the disaggregation policy of S404 may include multiple conditional statements such as:

If cause1 {
  set1(route), D1}
If cause2 {
  set2(route), D2}
If cause1 AND cause2 {
  union of set1 (route) AND set2 (route) for D1 and D2
} where cause1 and cause 2 are two different possible failures identified at S400 and set1 and set2 are corresponding disaggregation route sets. D1 and D2 are corresponding protected nodes.

As can be seen from the multi-conditional policy example above, it may be possible for multiple possible failures to occur at the same time. As an example and with reference to particular case of possible failures at S1, cause1 can be failure of M1-L1 link (with corresponding disaggregation route set including prefix A) and cause2 may be failure of M3-L4 link (with corresponding disaggregation route set including prefix D). Accordingly, when cause1 and cause 2 occur simultaneously, union of set1 and set2 would be prefix A and prefix B, which would be disaggregated. Furthermore, if there is any other prefix (e.g., prefix Q not shown) that can be reached (is accessible) via L1 and L4, such prefix will also be included in the union of set1 and set2. However, in case of either cause1 or cause2 (but not both), such prefix Q will not be included in the disaggregation route set for L1 or L4 as it is also accessible via the other one of L1 or L4.

At S406, first node generates an advertisement message. The advertisement message can include the disaggregation policy of S404 and an implementation type instruction for implementing the disaggregation policy (which may be referred to as a disaggregation implementation type). In other words, an implementation type instruction can cause a receiving node (e.g., node L1 or L2 in case M1 is the first node) to implement a particular type of mechanism to monitor for and detect failures. An implementation type may be a detection type or a signaled type. When the implementation type is a detection type, the advertisement message, in addition to the policy will include Operation, Administration and Management (OAM) details such as Seamless Bidirectional Forwarding Detection (S-BFD) discriminator of other leaf nodes the connection to which should be periodically checked using S-BFD packets to detect failure.

Taking server pod 308 as an isolated and simplified example, M1 generates an advertisement message for each of its southern nodes L1 and L2. In each advertisement node, M1 identifies a disaggregation policy (e.g., route set to be disaggregated if M1 fails, if M1-L1 fails and/or if M1-L2 link fails). The detection type instruction of the advertisement message can include the following information:

kvtie1={prefix(A), discrim(0x02020202), neigh(L2)}
kvtie2={prefix(B), discrim(0x01010101), neigh(L2)} where kvtie1 and kvtie1 are Routing in Fat Trees (RIFT) protocols. Discriminator 0x02020202 identifies L2 for L1 so that leaf node L1 can periodically transmit a S-BFD packet to L2 and depending on a response it receives back from L2, detect a failure. Discriminator 0x01010101 identifies L1 for L2 so that leaf node L2 can periodically transmit a S-BFD packet to L1 and depending on a response it receives back from L1, detect a failure.

In another example, implementation type instruction can be include a signaled implementation type, in which a protected node (e.g., M1) detects a failure and advertises the failure to the relevant downstream (southern) nodes via a market included in kvtie message. An example of such kvtie message is:

kvtie1={prefix(p11, p12), marker(0xa1), neigh(L2)} where "0xa1" is a marker that will be used by L1 to identify a M1-L2 failure and "0xa2" is an example market that will be used by L2 to identify a M1-L1 failure.

At S408, first node sends the advertisement message that includes the prefix disaggregation policy and the implementation type instruction to relevant southern nodes. For example, with M1 being the first node that identifies possible failures at S400, relevant southern nodes include leaf nodes L1 and L2. In another example and with S1 being the first node, relevant southern nodes include nodes M1, M3, M5, L1, L2, L3, L4, L5 and L6, to which the advertisement message will be sent.

Figure 5:
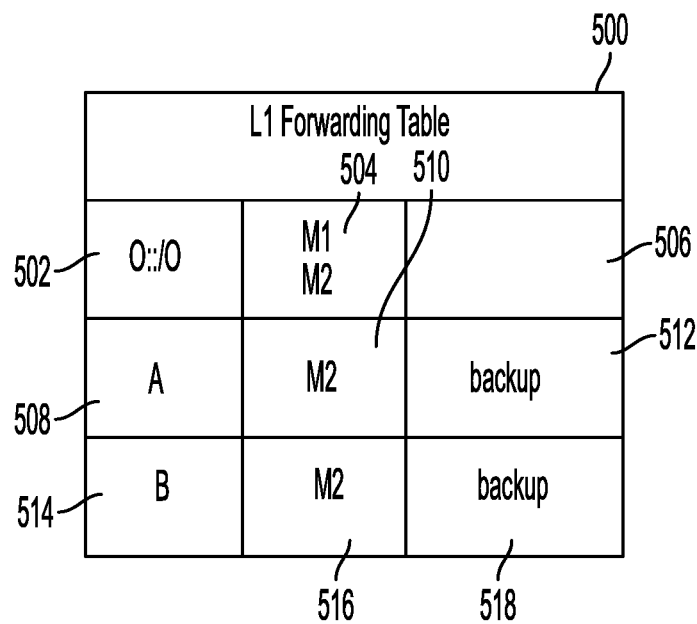
FIG. 5 illustrates a sample forwarding table with prefix disaggregation policy, according to one aspect of the present disclosure.
Figure 5:
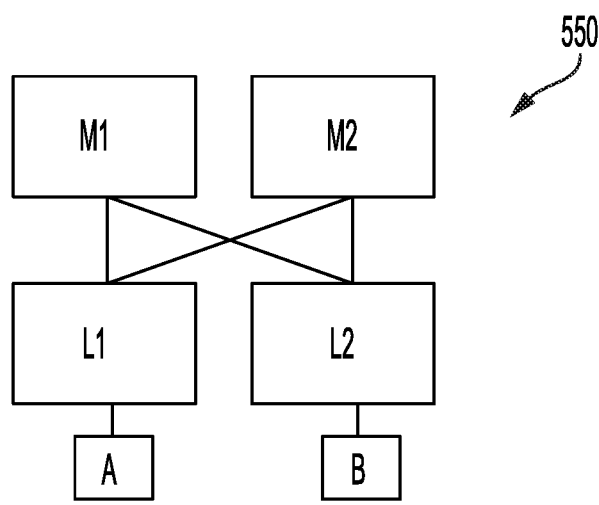

At S410 and using the advertisement message and the implementation type instruction included therein, first node causes each relevant southern node to detect a failure and implement corresponding prefix disaggregation policies. FIG. 5 illustrates a sample forwarding table with prefix disaggregation policy, according to one aspect of the present disclosure.

Table 500 of FIG. 5 is an example forwarding table for L1 when we consider a simplified example fabric 550 formed of M1, M2, L1 and L2 of FIG. 3. Table 500 includes entry 502 that indicates default operation of L1 without any detected failure (0::/0). For such default operation, entry 504 indicates that L1 should load balance between M1 and M2. Entry 506 is empty.

When a failure is detected (e.g., failure at M1, on link M1-L1 or M1-L2), entry 508 identifies a prefix for which a back/alternate route is to be selected. The alternate route is identified in entry 510, while entry 512 indicates that this alternate route is a backup when a failure is detected. Entries 508, 510 and 512 indicate that when a failure is detected (e.g., failure at M1, on link M1-L1 or M1-L2), L1 should use M2 as a backup to send traffic to prefix A. Similarly, entries 514, 516 and 518 indicate that when a failure is detected (e.g., failure at M1, on link M1-L1 or M1-L2), L1 should use M2 as a backup to send traffic to prefix B.

In one example, the above process of FIG. 4 can be optimized so as to only be implemented with respect to one or more preferred/priority prefixes. For example, industrial, Remote Direct Memory Access and Deterministic Networking prefixes can be identified as preferred/priority prefixes for which the above disaggregation policies should be implemented per FIG. 4 while the implementation of the same may be skipped with respect to leaf nodes via which non-preferred prefixes are accessible.

With above description, the disclosure now turns to describing example device/system structure that can be used as first node to implement functionalities of FIG. 4.

Figure 6:
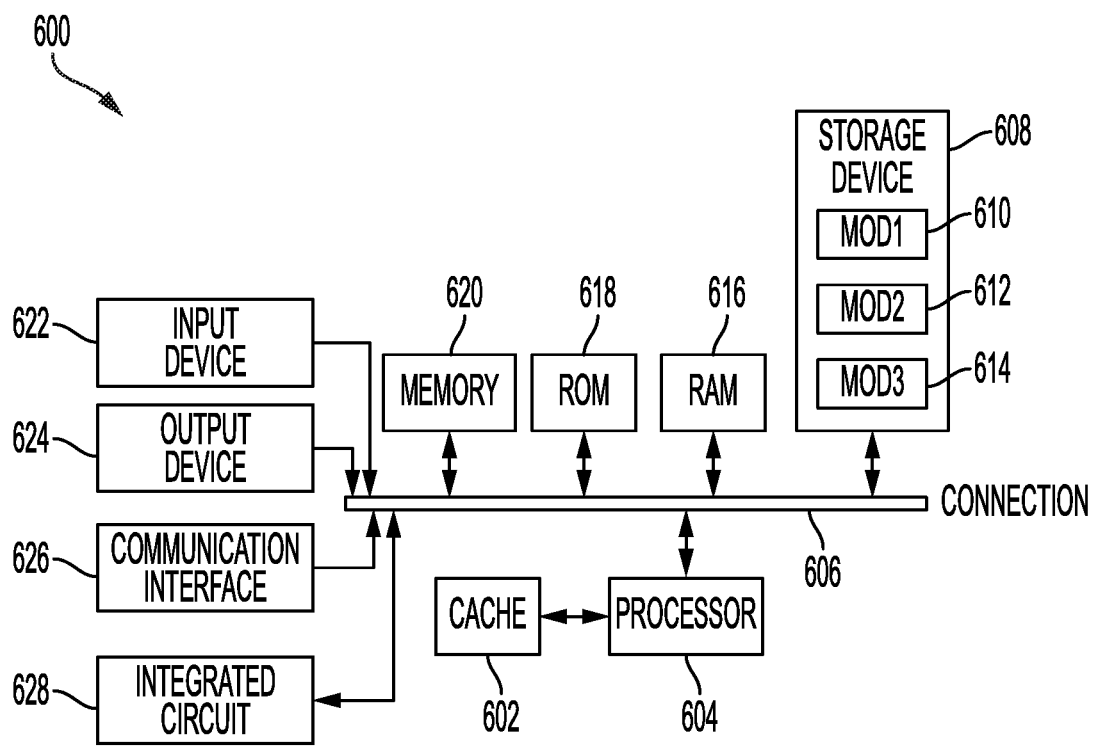
FIG. 6 illustrates an example system including various hardware computing components, according to an aspect of the present disclosure.

FIG. 6 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 6 illustrates system bus computing system architecture (system) 600 wherein the components of the system are in electrical communication with each other using a connection 606. Exemplary system 600 includes a cache 602 and a processing unit (CPU or processor) 604 and a system connection 606 that couples various system components including the system memory 620, such as read only memory (ROM) 618 and random access memory (RAM) 616, to the processor 604. System 600 can include a cache of high-speed memory connected directly with, in close proximity to, or integrated as part of the processor 604. System 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions. Other system memory 620 may be available for use as well. The memory 620 can include multiple different types of memory with different performance characteristics. The processor 604 can include any general purpose processor and a service component, such as service 1 610, service 2 612, and service 3 614 stored in storage device 608, configured to control the processor 604 as well as a special-purpose processor where software instructions are incorporated into the actual processor design. The processor 604 may essentially be a completely self-contained computing system, containing multiple cores or processors, a bus, memory controller, cache, etc. A multi-core processor may be symmetric or asymmetric.

To enable user interaction with system 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with system 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

System 600 can include an integrated circuit 628, such as an application-specific integrated circuit (ASIC) configured to perform various operations. The integrated circuit 628 can be coupled with the connection 606 in order to communicate with other components in system 600.

The storage device 608 can include software services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
determining, by a first node of a network fabric, a proactive corresponding prefix disaggregation policy for at least one second node of the network fabric, the proactive corresponding prefix disaggregation policy identifying one or more network prefixes that would be inaccessible via the first node if at a later time at least one communication failure is detected in association with the first node;
setting an implementation policy for the proactive corresponding prefix disaggregation policy to either a detection type or signaled type, the detection type including instructions to enable the second node to detect a communication failure, the signaled type including instructions for the second node to receive a communication failure notification from the first node;
sending the proactive corresponding prefix disaggregation policy and the implementation policy to the second node; and
causing the second node to implement the proactive corresponding prefix disaggregation policy in response to:
detecting, at the second node, the at least one communication failure when the setting set the implementation policy to the detection type; and
receiving, at the second node, a communication failure notification from the first node when the setting set the implementation policy to the signaled type.

2. The method of claim 1, wherein determining the proactive corresponding prefix disaggregation policy comprises:
identifying possible communication failures in association with the first node, the possible communication failures including corresponding link failures and node failures; and
determining a route set for each possible communication failure, each route set identifying the one or more network prefixes not reachable via the first node when a corresponding possible failure occurs.

3. The method of claim 2, wherein the proactive corresponding prefix disaggregation policy is determined based on all identified possible communication failures and all corresponding route sets.

4. The method of claim 1, wherein sending the proactive corresponding prefix disaggregation policy comprises:
generating an advertisement message for the second node, the advertisement message including the proactive corresponding prefix disaggregation policy and a disaggregation implementation type; and
sending the advertisement message to the second node.

5. The method of claim 1, wherein implementing the proactive corresponding prefix disaggregation policy causes the second node to update a corresponding traffic routing table to use an at least a third node to access the one or more network prefixes.

6. The method of claim 1, wherein
the network fabric has a tree structure;
the first node is a northern neighbor of the second node within the tree structure; and
the one or more network prefixes are connected to the second node and are accessible via the first node and at least one other northern neighbor of the second node.

7. A network node comprising:
memory having computer-readable instructions stored therein; and
one or more processors configured to execute the computer-readable instructions to:
determine a proactive corresponding prefix disaggregation policy for at least one first node of a network fabric, the proactive corresponding prefix disaggregation policy identifying one or more network prefixes that would be inaccessible via the network node if at a later time at least one communication failure is detected in association with the network node;
set an implementation policy for the proactive corresponding prefix disaggregation policy to either a detection type or signaled type, the detection type including instructions to enable the second first node to detect a communication failure, the signaled type including instructions for the second first node to receive a communication failure notification from the network node;

send the proactive corresponding prefix disaggregation policy and the implementation policy to the first node; and cause the first node to implement the proactive corresponding prefix disaggregation policy in response to:
   detecting, at the first node, the at least one communication failure when the setting set the implementation policy to the detection type; and
   receiving, at the first node, a communication failure notification from the network node when the setting set the implementation policy to the signaled type.

8. The network node of claim 7, wherein the one or more processors are configured to execute the computer-readable instructions to:
   identify possible communication failures in association with the network node, the possible communication failures including corresponding link failures and node failures; and
   determine a route set for each possible communication failure, each route set identifying the one or more network prefixes not reachable via the network node when a corresponding possible failure occurs.

9. The network node of claim 8, wherein the proactive corresponding prefix disaggregation policy is determined based on all identified possible communication failures and all corresponding route sets.

10. The network node of claim 7, wherein the one or more processors are configured to execute the computer-readable instructions to:
   generate an advertisement message for the first node, the advertisement message including the proactive corresponding prefix disaggregation policy and a disaggregation implementation type; and
   send the advertisement message to the first node.

11. The network node of claim 7, wherein implementing the proactive corresponding prefix disaggregation policy causes the first node to update a corresponding traffic routing table to use at least a second node to access the one or more network prefixes.

12. The network node of claim 7, wherein
   the network fabric has a tree structure;
   the network node is a northern neighbor of the first node within the tree structure; and
   the one or more network prefixes are connected to the first node and are accessible via the network node and at least one other northern neighbor of the first node when no communication failure is present in association with the network node.

13. One or more non-transitory computer-readable media comprising computer-readable instructions, which when executed by one or more processors of a network node, cause the network node to:
   determine a proactive corresponding prefix disaggregation policy for at least one first node of a network fabric, the proactive corresponding prefix disaggregation policy identifying one or more network prefixes that would be inaccessible via the network node if at a later time at least one communication failure is detected in association with the network node;
   set an implementation policy for the proactive corresponding prefix disaggregation policy to either a detection type or signaled type, the detection type including instructions to enable the first node to detect a communication failure, the signaled type including instructions for the first node to receive a communication failure notification from the network node;
   send the proactive corresponding prefix disaggregation policy and the implementation policy to the first node; and
   cause the first node to implement the proactive corresponding prefix disaggregation policy in response to:
      detecting, at the first node, the at least one communication failure when the setting set the implementation policy to the detection type; and
      receiving, at the first node, a communication failure notification from the network node when the setting set the implementation policy to the signaled type.

14. The one more non-transitory computer-readable media of claim 13, wherein execution of the computer-readable instructions by the one or more processors, cause the network node to:
   identify possible communication failures in association with the network node, the possible communication failures including corresponding link failures and node failures; and
   determine a route set for each possible communication failure, each route set identifying the one or more network prefixes not reachable via the network node when a corresponding possible failure occurs.

15. The one more non-transitory computer-readable media of claim 14, wherein the proactive corresponding prefix disaggregation policy is determined based on all identified possible communication failures and all corresponding route sets.

16. The one more non-transitory computer-readable media of claim 13, wherein execution of the computer-readable instructions by the one or more processors, cause the network node to:
   generate an advertisement message for the first node, the advertisement message including the proactive corresponding prefix disaggregation policy and a disaggregation implementation type; and
   send the advertisement message to the first node.

17. The one more non-transitory computer-readable media of claim 13, wherein implementing the proactive corresponding prefix disaggregation policy causes the first node to update a corresponding traffic routing table to use an at least a second node to access the one or more network prefixes.

18. The one more non-transitory computer-readable media of claim 13, wherein
   the network fabric has a tree structure;
   the network node is a northern neighbor of the first node within the tree structure; and
   the one or more network prefixes are connected to the first node and are accessible via the network node and at least one other northern neighbor of the first node when no communication failure is present in association with the network node.

* * * * *